Jan. 5, 1937. C. CAMPBELL 2,066,764
TABULATING MACHINE
Filed Oct. 27, 1931 6 Sheets-Sheet 1

INVENTOR-
C. Campbell
BY
WM Wilson
ATTORNEY-

Jan. 5, 1937. — C. CAMPBELL — 2,066,764
TABULATING MACHINE
Filed Oct. 27, 1931 — 6 Sheets-Sheet 2

INVENTOR
C. Campbell
BY
WM Wilson
ATTORNEY

Jan. 5, 1937.  C. CAMPBELL  2,066,764
TABULATING MACHINE
Filed Oct. 27, 1931  6 Sheets-Sheet 3

INVENTOR-
C. Campbell
BY
W M Wilson
ATTORNEY-

Jan. 5, 1937.  C. CAMPBELL  2,066,764
TABULATING MACHINE
Filed Oct. 27, 1931  6 Sheets-Sheet 4

FIG. 6ᵃ

INVENTOR-
C. Campbell
BY
W. M. Wilson
ATTORNEY-

Jan. 5, 1937.  C. CAMPBELL  2,066,764
TABULATING MACHINE
Filed Oct. 27, 1931   6 Sheets-Sheet 5

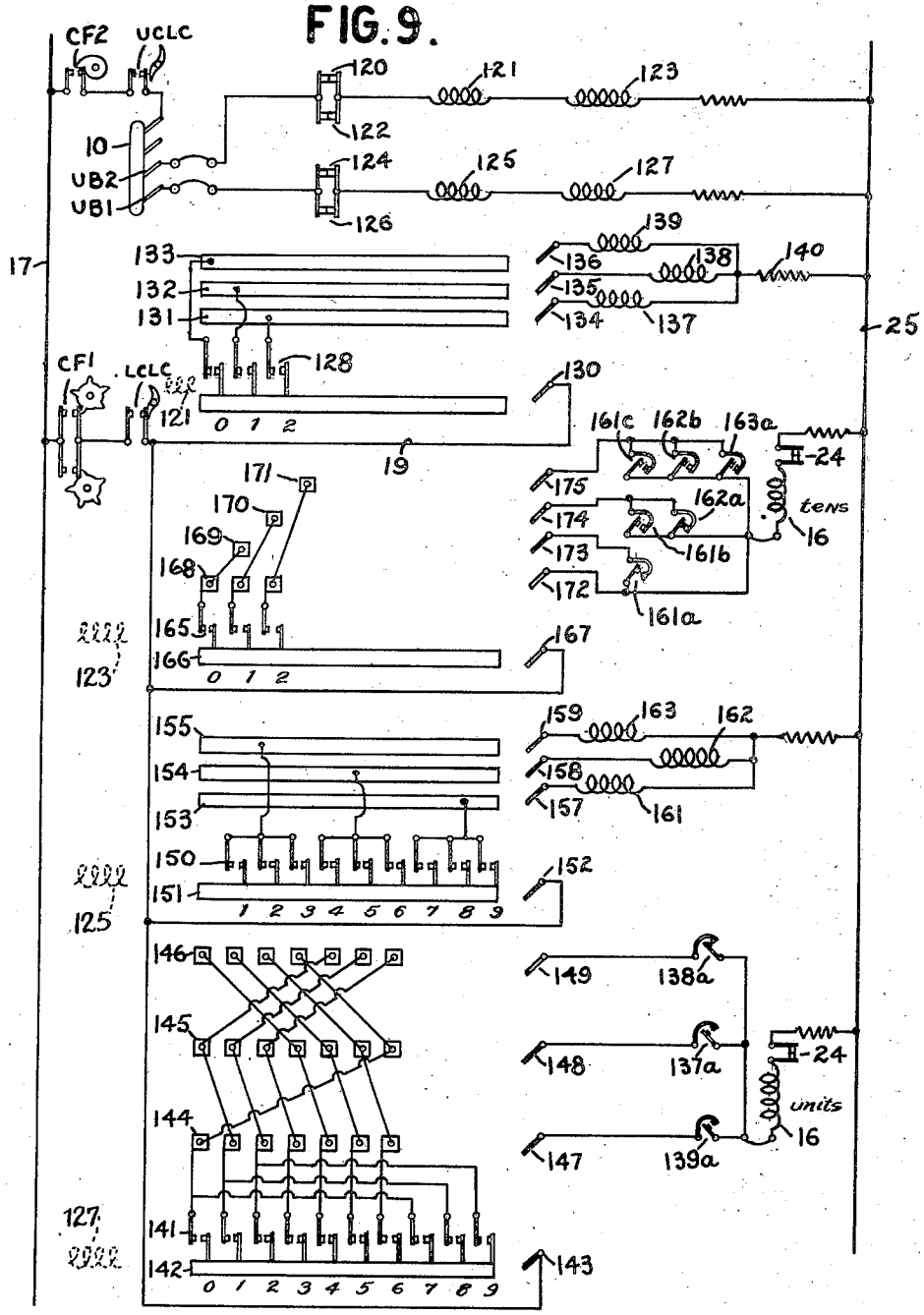

Patented Jan. 5, 1937

2,066,764

UNITED STATES PATENT OFFICE 2,066,764

TABULATING MACHINE

Charles Campbell, London, England, assignor, by mesne assignments, to International Business Machines Corporation, New York, N. Y., a corporation of New York Application October 27, 1931, Serial No. 571,331 In Great Britain July 2, 1931

6 Claims. (Cl. 235—92)

This invention relates to statistical, calculating or like machines arranged to handle amounts involving vulgar fractions such as sums of money expressed in the British or Indian currency or weights according to the British system.

For the sake of simplicity the problem with which the present invention is concerned will be explained in connection with adding mechanism but the invention is applicable to other calculating mechanisms. Fractions may be handled in adding mechanism by providing a denominational adding element operating according to a notation the base of which is the denominator of the fractions, the numerators of the fractions being entered into the adding element. Thus eighths can be handled in an adding element operating according to the eighths notation, that is, on an eight-point cycle. It is not, however, convenient, for various reasons, to employ an adding element operating in accordance with a notation of a higher base than ten, although pence have been dealt with in this way, and the difficulty involved in so operating an adding element increases with base of the notation. It is the practice to split such fractions into two fractions the denominators of which are less than ten. Thus sixteenths would be treated as halves and eighths of halves and entered into a "halves" adding element operating in the two notations and the "eighths" adding element operating on the eighths notation and transferring to the first adding element. If seven sixteenths is to be entered, seven should be entered into the eighths adding element while if thirteen sixteenths is to be added, one should be entered into the halves adding element and five into the eighths adding element. Hitherto it has been necessary to enter and print or otherwise record the amounts in the notation suitable for adding mechanism. Thus thirteen sixteenths would be entered and recorded as 15 which is inconvenient.

It is the object of this invention to provide means whereby an amount expressed in one notation may be converted into the terms of another notation appropriate to the device into which it is to be entered. Accordingly, the invention provides the combination with an entering device and a receiving device operating according to different notations, of translating mechanism arranged to receive from the entering device an amount expressed in the notation appropriate to that device, to convert it into the terms of the notation appropriate to the receiving device and to transmit the converted amount to the receiving device. The phrase "entering device" is intended to cover not merely the record reading device controlling the machine, but also, where the context so permits, any device from which amounts are transferred to a receiving device. Thus the entering device could be an adding or other calculating mechanism and the receiving device a printing mechanism.

According to another feature of the invention, there is provided a statistical, calculating or like machine comprising in combination a primary entering device operable in accordance with a normal notation, an adding mechanism operable in accordance with a special notation and a translating mechanism automatically operable to receive amounts from the entering device, to convert them from the normal notation into the special notation and to enter the converted amounts to the adding mechanism.

In order to permit of amounts entered being subtracted, the translating mechanism may also be operable to obtain the complements of the converted amounts and selecting mechanism may be provided for determining whether the converted amount or its complement is transmitted to the adding mechanism in accordance with whether the entered amount is to be added or subtracted.

When the machine includes mechanism for recording a total standing on the adding mechanism it is desirable that this total should be recorded in the normal notation. For this purpose a second translator may be provided which is automatically operable to reconvert the total standing in the adding mechanism into the terms of the normal notation and to control the recording of the reconverted amount by the recording mechanism. In order to allow of the recording of the amounts entered, an operative connection may be provided between the entering device and the recording mechanism.

According to a further feature of this invention the translating mechanism comprises a units portion and a tens portion which are arranged for adjustment each in accordance with both a units digit and a tens digit entered to transmit a units digit and a tens digit respectively to the receiving device. When the receiving device is of the kind whose operation depends on the time of its cycle of operations at which a controlling impulse is received by it, the units of each portion of the translating mechanism may be operable in synchronism with the receiving device, adjustable in accordance with the digit entered in its denomination to transmit an impulse to the receiving device at a unique time in its own cycle of operation and include means whereby the phase relationship between it and the receiving device is varied automatically in accordance with the digit entered in the other denomination.

Two embodiments of the present invention as applied to a record-card-controlled statistical machine will now be described, by way of example only, with reference to the accompanying drawings, in which:

Fig. 1 is a sectional view of the printing mechanism.

Figs. 2 and 3 taken together form a simplified circuit diagram for a statistical machine arranged to handle sixteenths.

Fig. 6a is a detail of the latching devices shown in Fig. 6.

Figure 8:
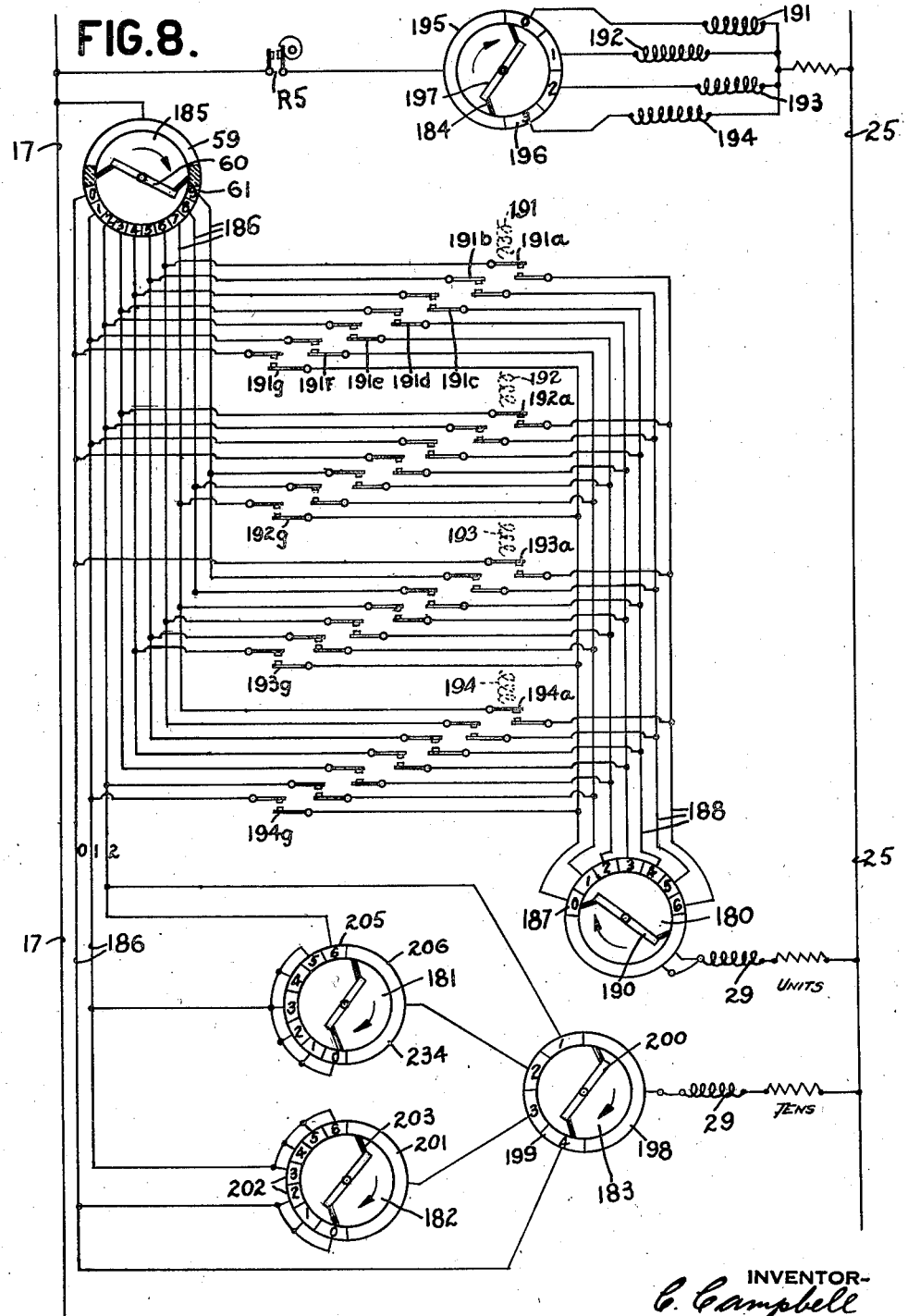

Figs. 8 and 9 taken together form a circuit diagram for translating mechanism arranged to deal with twenty-eighths.

Like reference numerals indicate like parts in all the figures of the drawings.

The invention will be described as applied to a machine of the kind shown in the patent to G. F. Daly et al. No. 1,762,145, issued June 10, 1930. As this kind of machine is well known it will only be described sufficiently for an understanding of the present invention and reference should be made to the above mentioned patent for a more detailed description.

*General arrangement*

The machine which will now be described is arranged to add and subtract amounts expressed in terms of the Indian currency, that is in rupees and annas. Before describing the manner in which the annas or sixteenths of a rupee are dealt with a general description of the machine and the manner in which it handles rupees will be given. The rupees are decimal amounts and are dealt with in the usual manner by means of decimal adding and printing mechanism.

Figure 1:
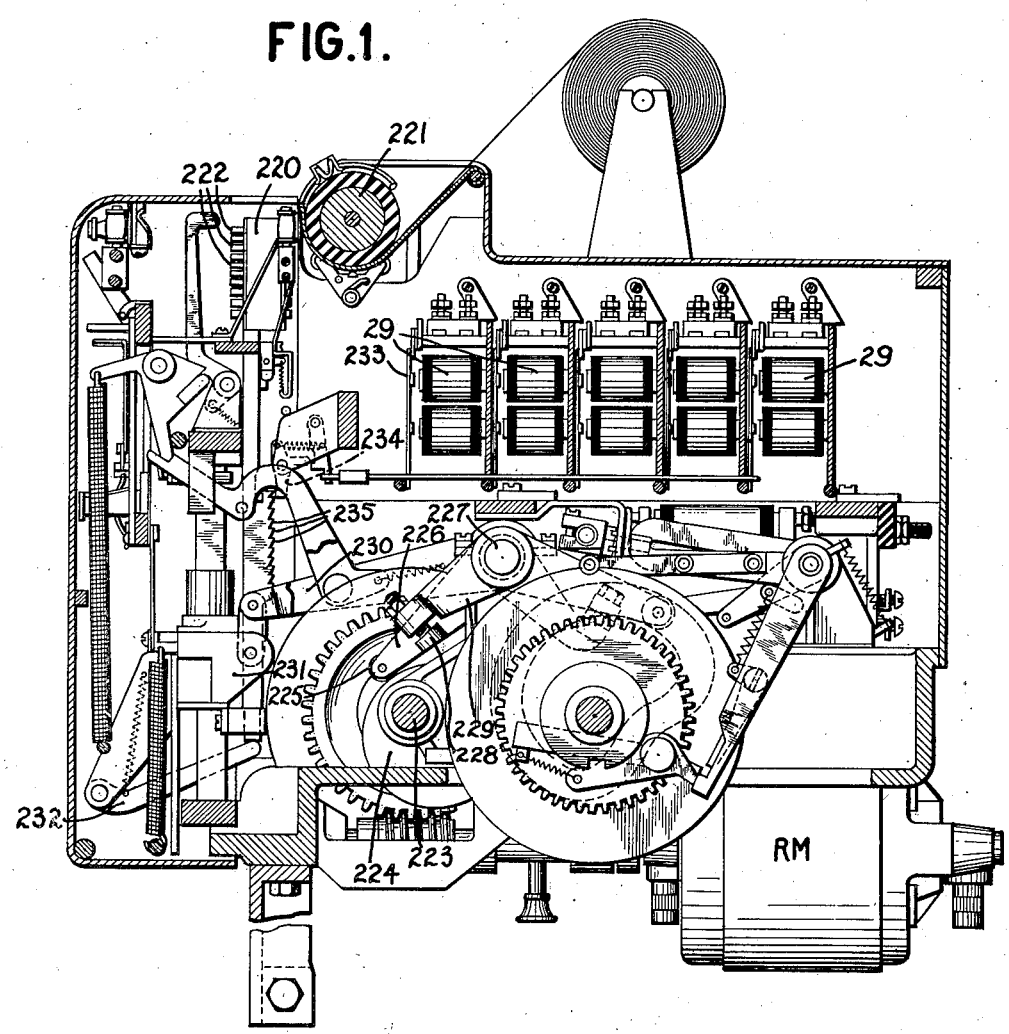

The machine is controlled by "Hollerith" cards in which each digit is represented by the position or a hole in a column of ten index points or hole positions in a known manner. The machine is driven during card feeding operations by a tabulating motor, not shown, and during total printing and resetting operations by a reset motor RM (Fig. 1).

The tabulating motor drives card feeding mechanism of a conventional kind which feeds each card between a contact roll 10 (Fig. 2) and upper brushes UB and then past lower brushes LB and a contact roll 11. Each card passes the lower brushes in synchronism with the passage of the succeeding card past the upper brushes.

The tabulating motor also drives a shaft 12 (Fig. 4) through suitable gearing and this shaft drives the accumulator or adding mechanism of the machine. A plurality of gear wheels 13 are loosely mounted on the shaft 12 and are provided each with one half of a clutch 14, the other half of which is splined on the shaft 12. The clutch 14 is normally held disengaged by mechanism 15 in the usual manner. The mechanism 15 is controlled by an electromagnet 16 which when energized causes the mechanism 15 to engage the clutch. The gear wheel 13 then turns with the shaft 12 until the zero time in the cycle of the machine when the clutch is demeshed and the gear wheel comes to rest. The magnet 16 (Fig. 2) is energized over a circuit extending from a main supply line 17 through cam contacts CF1, lower card lever contacts LCLC which are closed so long as cards are feeding past the lower brushes, a line 19, the contact roll 11, a lower brush LB, a plug connection 20, a line 21, a pair of normally closed contacts 22a, a plug connection 23, the magnet 16 and a pair of contacts 24 to another supply line 25. This circuit will be established at a time determined by the position of a hole in the column read by the brush LB and the corresponding gear wheel 13 will begin to turn. Since the cards are fed with the nine holes leading, the gear wheel will turn to an extent which is proportional to the value of the digit represented by the hole before it is disconnected at the zero time in the cycle. Each gear wheel 13 meshes with a gear wheel 26 which is secured to a counter wheel 27 loosely mounted on a shaft 28.

The counter wheels 27 are arranged to turn through a complete revolution for an entry of 10 while the shaft 12 turns through a complete revolution per machine cycle and through a ten-four-teenths of a revolution during the time required to enter 10. The gear ratio between wheels 26 and 13 is therefore 10 to 14. The gears are not shown in this ratio in Fig. 4. The ratio shown is that in the units order of the accumulator; i. e., the order in which annas are to be entered. The reason for the ratio so shown will be hereinafter explained.

Tens transfer mechanism is provided between the various counting wheels 27. This mechanism is not shown and may be of any convenient form. Further detailed explanation of this well known accumulating mechanism and its transfer devices may be found in the Patent #1,307,740, issued June 24, 1919 to C. D. Lake.

The amounts added in this manner may also be printed by means of printing mechanism such as is shown in Fig. 1. The type bar 220 is positioned relatively to the platen 221 to bring the proper type 222 into printing position opposite the platen. The total taking shaft 223 driven by the reset motor RM is provided with a cam 224 cooperating with a roller 225 carried on arm 226 freely rotatable on shaft 227. As the cam rotates, arm 226 rocks clockwise and a lug 228 cooperating with an arm 229 fixed to shaft 227 also rocks clockwise. An arm 230 fixed to shaft 227 is linked to printing crosshead 231 which serves to raise the type bar 220 in synchronism with the total taking operation so that the type 222 successively pass printing position opposite platen 221. Owing to spring operated scissors connections 232, however, the type bar may be arrested in any printing position without interfering with the upward movement of the crosshead 231. The type bar is arrested under control of the printing magnet 29. When this is energized it attracts its armature 233 and pulls a call wire to the right thereby releasing a latch member normally holding stop pawl 234. When the pawl is so released it is spring operated to engage ratchet teeth 235 formed on the type bar 220 to prevent further upward movement of the type bar, thus holding a particular type 222 in printing position.

The printing magnets 29 (Fig. 2) may be energized from circuits extending through the lower brushes and wires 30 to the printing magnets. When thus energized each printing magnet arrests a type bar in a position to print a digit. The time at which each magnet is energized is determined by the position of the controlling hole in the card and in turn determines the digit which the corresponding type bar will be positioned to print.

Figure 6:
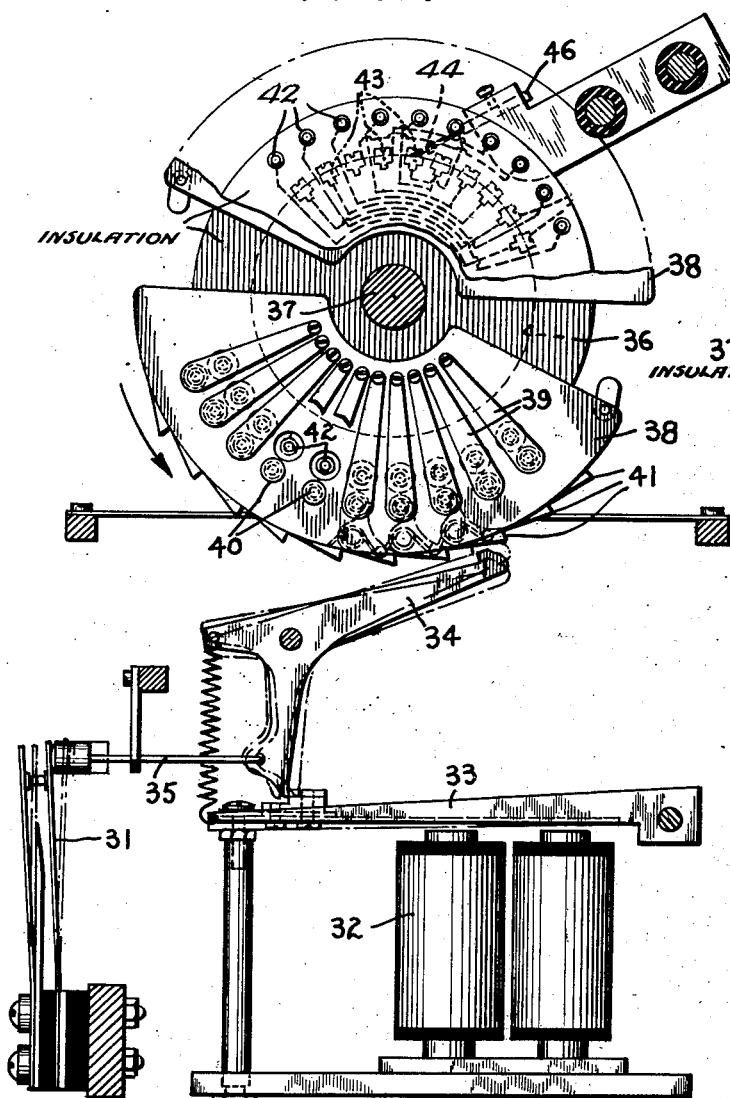
Fig. 6 is an elevation of one translating unit employed in the machine.
Figure 7:
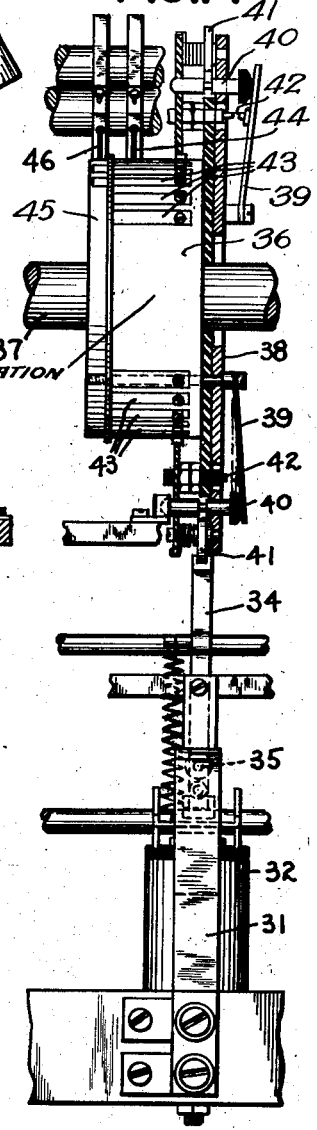
Fig. 7 is an end elevation of Fig. 6.
Figure 7:
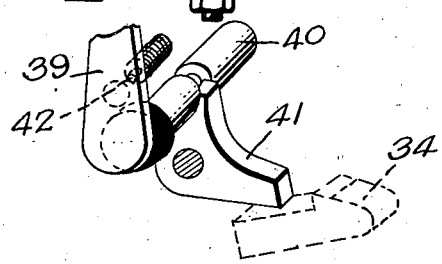

The amounts read from the cards may be subtracted instead of being added. Subtraction is effected in a known manner by entering the complement of the amount read from the card into the adding mechanism. The complement is obtained by means of a translator of the kind described in British patent specification No. 288,516. This mechanism is illustrated in Figs. 6 and 7. As each card passes the upper brush a circuit is established from the line 17 through contacts CF2 which are operated during card feeding cycles only, card lever contacts UCLC closed so long as cards are passing the upper brushes, normally closed contacts 31 and a translator magnet 32 to the other main line 25. The magnet 32 when thus energized attracts its armature 33 which normally latches a spring-pressed trip latch 34. The trip latch moves upwardly to the upper dotted line position as shown and permits a rod 35 to move to the right and to allow the contacts 31 to open and interrupt the circuit of the magnet 32. A disk 36 of insulated material is mounted on a shaft 37 which is driven by the tabulating motor and carries two sector-shaped metal plates 38. The shaft 37 makes one revolution for two card cycles so that one of the plates 38 is moved past the trip lever 34 during one cycle and the other plate during the other cycle. Each plate 28 carries a series of spring blades 39 each of which is held open by a plunger 40 which is engaged by one end of a pivoted trip pawl 41 (see Fig. 6a) the other end of which projects from the disk so as to miss the hooked end of the trip lever when the latter is in latched position but to engage it when it is unlatched as described above.

Figure 2:
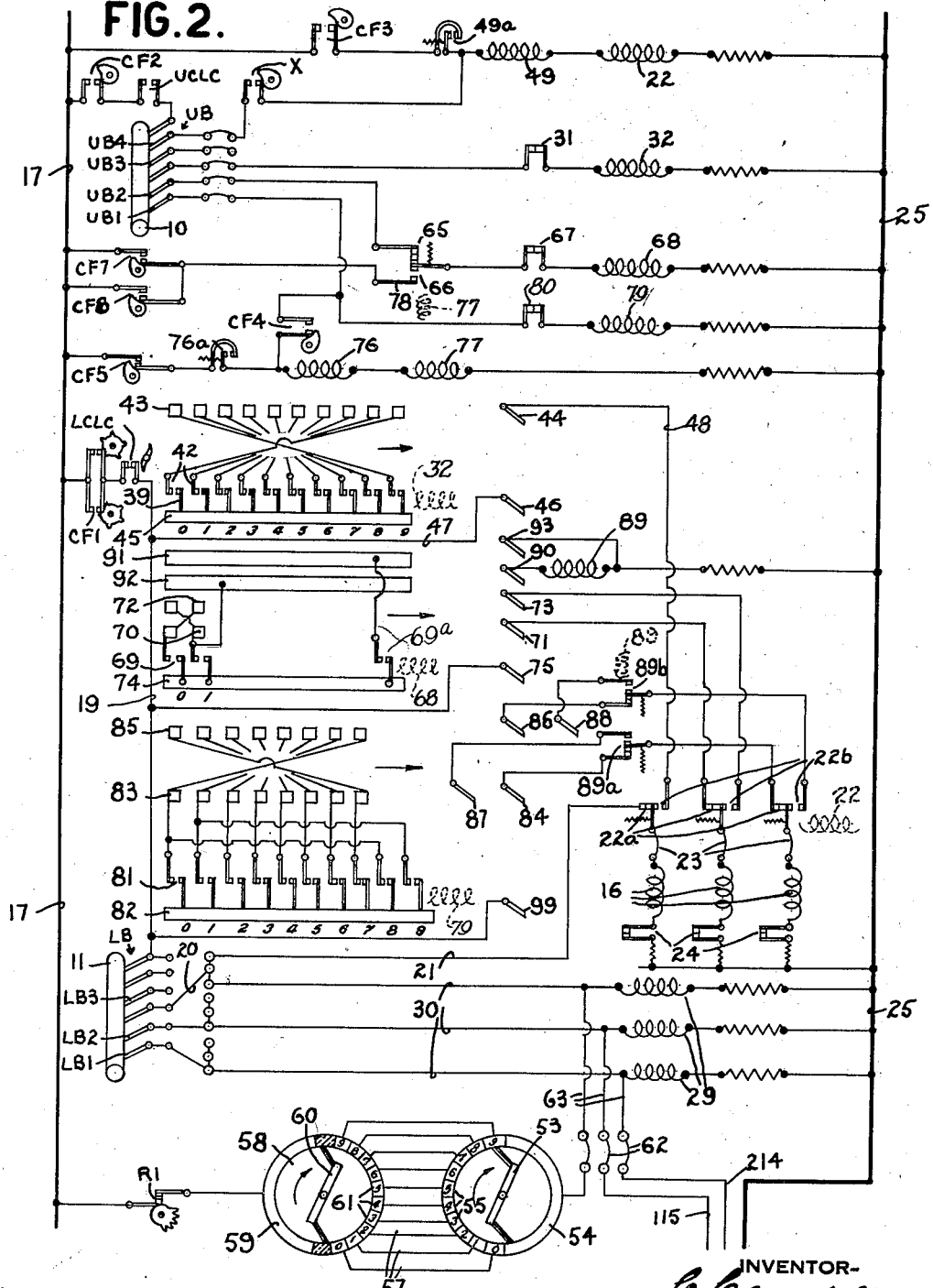

The spring contact blades cooperate with individual contacts 42 mounted on the disk 36 and passing through openings in the plates 38 so that when the magnet 32 is energized the trip lever 34 rocks one of the trip pawls 41 which unlatches its plunger 40 so that the corresponding contact blade 39 may engage its contact 42. Which of the contacts 39, 42 is thus closed depends on the time in the cycle at which the magnet is energized. Since the trip pawls 41 pass the trip lever 34 in synchronism with the passage of the hole positions past the brushes, the contact closed will correspond to the digit read. Each of the contacts 42 is connected to a commutator segment 43 (see also Fig. 2) which segments pass under a brush 44 in synchronism with the cycle of the machine. As shown in Figs. 2 and 6 the contacts 42 are cross-connected to the segments 43, so that the leading contact 42 is connected to the trailing segment 43 and so on. All the contact blades 39 are connected to a common segment 45 which is read by a brush 46. The translator is in duplicate so that one half may be set up by the magnet 32 during one card cycle while the other half which was set up during the preceding card cycle is being read by the brushes 44 and 46. For the sake of simplicity only one half of the translator is shown in Fig. 2. Assuming that "8" is read by the brushes, the second pair of contacts from the right in Fig. 2 will be closed during one card cycle. During the next card cycle when the card in question has reached the lower brushes a circuit will be set up from the line 17 through the contacts CF1, the lower card lever contacts, a line 47, brush 46, the segment 45, the closed contacts 39 and 42 which correspond to the digit 8, the second segment 43 from the left and the brush 44 to a line 48. Since the segments 43 pass the brush 44 in synchronism with the machine cycle, this circuit is established at the "one" time of the cycle, that is at this time corresponding to the complement with respect to 9 of the entered digit.

If contacts 22b are closed, the circuit will continue through the plug wire 23, and adding magnets 16 and the contacts 24 to the line 25. The contacts 22a and 22b are controlled by a magnet 22 (Fig. 2) which is energized whenever a hole is read in the so-called "X" position of a column of the record card. This hole denotes that the amount on that card is to be subtracted and when it is read a circuit is established from the line 17 through the contacts CF2 and UCLC, the contact roll 10, an upper brush UB4, cam contacts X, timed to close only while the "X" hole positions are passing the brushes, a holding relay coil 49 and the magnet 22 to the other main line 25. The holding coil 49 then closes its contacts 49a and establishes a holding circuit for itself and the magnet 22 through cam contacts CF3. These contacts are closed except for a short period after the zero time in each card cycle. Thus, when an "X" hole is read these contacts are closed and they will remain closed during the whole of the entering portion of the next cycle. When energized the magnet 22 opens its contacts 22a and closes its contacts 22b connecting the corresponding adding magnet 16 to the brush 44 of the translator and disconnecting it from the lower brushes so that the complement of the amount on the card will be entered from the translator instead of the amount read by the lower brushes.

The machine is provided with the usual control circuits which maintain the tabulating motor in operation so long as the cards read by the upper brushes belong to the same group as the card passing the lower brush. This mechanism compares the holes representing the group number on the card passing the lower brushes with the corresponding holes on the card passing the upper brush and interrupts the operation of the tabulating motor as soon as these holes disagree.

The interruption of the operation of the tabulating motor results in the card feeding mechanism ceasing to operate and the accumulators not being driven. Simultaneously the energizing circuit for the reset motor is completed automatically and the machine goes through a total print and resetting cycle. The totals are printed during the first half of this cycle in the manner which will be explained below and the accumulator is reset during the second half of the cycle in the known manner. The resetting motor is arranged to drive the printing mechanism so that totals may be printed and also certain total timing commutators or impulse emitters which will be described later. The control circuits are fully described in the Patent 1,762,145 aforesaid and have not been shown in the drawings.

The machine is provided with mechanism for reading out totals standing on the accumulator to the printing mechanism, which reading out mechanism will now be described.

The gear wheels 13 (Fig. 5) for the decimal adding wheels 27 mesh with gear wheels 50 which are loosely mounted on a shaft 51. Each wheel 50 has an insulating disk 52 secured to it and a pair of brushes 53 are secured to this disk so as to be insulated from the gear wheel. The gear ratio between the wheels 50 and 13 is 20 to 14 so that the gear wheel 50 makes half a revolution for an entry of 10, that is while the adding wheel 27 is turning through one revolution. The brushes 53 cooperate one with a commutator segment 54 and the other with one of ten conducting segments 55 mounted in an insulating segment 56. One of the decimal commutators is shown at the bottom of Fig. 2 and it will be seen that the brushes 53 connect one of the segments 55 to the segment 54 in accordance with the value standing in that denominator of the accumulator. Like conducting segments 55 are connected together by bus-bars 57 which are connected each to a separate one of ten segments 61 on an emitting commutator 58.

The emitting commutator has a common segment 59 and a pair of brushes 60 which are driven in synchronism with the machine cycle to connect each segment 61 in turn to the segment 59. The arrangement is such that the segment 61 which is engaged by a brush 60 at the nine time in the cycle is connected to all the segments 55 which are engaged by a brush 53 when the corresponding adding wheel stands at 9 and so on.

The brush 60 is driven by the reset motor and, when a total print and reset operation is initiated, a circuit will be established from the line 17, through star cam contacts R1 which are operated during reset cycles only, the segment 59, brush 60, one of the segments 61, the corresponding bus line 57 to the corresponding segment 55 of one of the read-out commutators, the brush 53, the segment 54, a plug wire 62, a line 63, and the corresponding print magnet 29, to the other supply line 25. The time at which this circuit is established depends on the position of the brush 53 and corresponds to the digit represented by the position of this brush so that the amount standing in this denomination of the accumulator will be printed.

The above has explained how decimal portions of the amounts, that is, amounts entered in all orders but the units and tens orders, may be added or subtracted and the total printed. This has been explained in connection with Fig. 4 which shows the arrangement of parts in the units order but it will be understood that the higher orders differ from Fig. 4 only in the ratio of the gearing 26, 13 and 50 or 50a. The manner in which non-decimal portions of the amounts are entered will now be explained.

Entering sixteenths

The system in accordance with which sixteenths are handled is shown in Table I below:

Table I

| Punching | Listing | Adding | Subtracting | Total print |
|---|---|---|---|---|
| 00 | -------- | 00 | 17 | -------- |
| 01 | 1 | 01 | 16 | 1 |
| 02 | 2 | 02 | 15 | 2 |
| 03 | 3 | 03 | 14 | 3 |
| 04 | 4 | 04 | 13 | 4 |
| 05 | 5 | 05 | 12 | 5 |
| 06 | 6 | 06 | 11 | 6 |
| 07 | 7 | 07 | 10 | 7 |
| 08 | 8 | 10 | 07 | 8 |
| 09 | 9 | 11 | 06 | 9 |
| 10 | 10 | 12 | 05 | 10 |
| 11 | 11 | 13 | 04 | 11 |
| 12 | 12 | 14 | 03 | 12 |
| 13 | 13 | 15 | 02 | 13 |
| 14 | 14 | 16 | 01 | 14 |
| 15 | 15 | 17 | 00 | 15 |

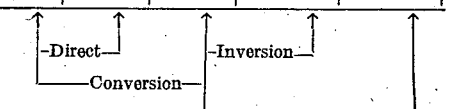

It is proposed that the numerator of the fraction should be punched in the card, that is to say, in the case of rupees and annas, the amount would be punched in accordance with the usual notation. This is shown in the first column of the table. Listing, that is to say, the printing of the amounts entered is effected directly from the cards so that the amount actually punched is printed as shown in the second column of the table. For adding purposes, the amounts are converted from the normal notation into the special notation appropriate to the adding mechanism. This notation involves halves of rupees and eighths of halves of rupees and as shown in column 3, the numbers run from 00 to 07 and then from 10 to 17. Subtracting involves inverting the converted amounts as shown in column 4 of the table. This inversion gives the complement in the special notation of the amount entered, which, when added in, is equivalent to subtracting the converted amount. In order that the total might be printed, it is necessary to reconvert the total standing in the adding mechanism back into the normal notation as shown by column 5 of the table.

Two special denominational adding sections are required for dealing with sixteenths and will be referred to as the units and the tens sections. The units section is arranged for an eighths notation and the gear ratio between the wheel 13 and the wheel 26 is 14 to 8 so that the adding wheel will make a complete revolution for an entry of eight. The units gear wheel 13 drives the corresponding wheel 50a through idler gears 64 so that the gear ratio between them is 16 to 14 and the units wheel 50a makes half a revolution for a revolution of the units wheel 27. The idler gears 64 are provided in order that all the wheels 50 and 50a may be mounted to turn about the same axis in spite of the difference in gear ratio. The tens gear wheel 26 and the tens wheel 13 have a gear ratio of 10 to 14 as in the case of the decimal wheels, and in the same way the tens wheel 50 and the tens wheel 13 have the gear ratio 20 to 14. The tens wheel is, however, arranged to transfer after every alternate step of movement, that is five times per revolution, and will thus read either 1 or 0. The arrangement of the reading out commutators for the tens and units wheels will be explained later.

The conversion and the inversion of the annas amounts entered is effected by means of translating units similar to that shown in Fig. 6. The tens column of the annas field on the card is read by a brush UB2 which is plugged to a contact blade 65. The contact blade is normally in contact with a blade 66 which is connected through contacts 67 of the tens translating unit to the magnet of that unit. The magnet 68 is thus normally energized from the brush UB2 and closes one or the other of two pairs of contacts 69 corresponding to the contacts 42, 39 and allocated to the digits 0 and 1. The contacts 69 are connected directly to commutator segments 70 which are read by a brush 71 at the 0 and 1 time in the cycle and which are cross-connected to a second pair of segments 72 which are also read at the 0 and 1 time by a brush 73. The contacts 69 are also connected to a common segment 74 read by a brush 75 which is connected to the line 19.

If the left-hand, that is the 0, segment 69 is closed, a circuit will be established to the brush 71 at the 0 time and to the brush 73 at the 1 time. The brushes 71 and 73 are connected by contacts 22a and 22b respectively of the relay 22 to the tens adding magnet 16 so that if the amount being read is to be added, an impulse will be transmitted through the brush 71, while if it is to be subtracted an impulse will be transmitted through the brush 73. The impulse through the brush 73 represents the complement of the digit represented by the impulse through the brush 71. Referring to columns 1 and 3 of the table given above it will be noted that 1 must be entered whenever the tens digit is 1 and that 0 is to be entered when the tens digit is 0 unless the units digit is 8 or 9 when 1 has to be entered instead of 0. In order to enter 1 instead of 0 when the 8 or 9 is read in the units column of the annas field, the upper brush UB1 that reads this field is connected through cam contacts CF4 to a relay coil 76 and a relay 77. The cam contacts CF4 operate during card feeding cycles and are normally open but close while the 8 and 9 positions on the card are being read. Thus, if the brush UB1 encounters an 8 or 9 hole a circuit will be set up through this brush, the contacts CF4 and the coils 76 and 77. The coil 76 closes its contacts 76a and establishes a holding circuit through cam contact CF5 and the contacts 76a and coils 76 and 77. The coil 77 when thus energized disengages the contacts 65 and 66 and engages the contact 66 with the contact 78, thereby connecting the tens translator magnet 68 in series with cam contacts CF7 and cam contacts CF8, these cam contacts being in parallel with one another. The cam contacts CF7 are arranged to close at the eight time in the cycle so that the translator magnet 68 will be energized in this time and will close the pair of contacts 69a whose function will be explained later. This circuit is immediately broken by the opening of the contacts 67 and the trip lever 34 is relatched against the armature of the magnet 68 by the movement of the trip pawl which it has just engaged.

The translator is thus in condition for a second set-up. This set-up is effected by the contacts CF8 which close at the one time in the cycle to energize the magnet 68 and close the contact 69 corresponding to the digit 1. It will be seen that, when the units digit read is 8 or 9, an entry of 1 is made into the tens translator. The units translator is controlled by a magnet 79 which is energized over a circuit extending from the brush UB1 through the units translator contacts 80. The units translator is provided with tens contacts 81 one for each digit in the normal notation, one of which is closed in accordance with the units digit read. The contacts 81 are connected on one side to a common segment 82 cooperating with a brush 99 which is connected to the line 19. The contacts 81 corresponding to the digits 0 to 7 are connected each to a commutator segment 83, there being eight segments 83 one for each digit in the denomination appropriate to the adding mechanism. The segments 83 are normally spaced so that they may be read by a normally positioned brush 84 at the times corresponding to the digits 0 to 7. Thus, if the contacts 81 allocated to the digit 4 are closed, the connected segment 83 will be engaged at the brush 84 by the four time in the cycle. The contacts for the digit 8 are cross-connected to the segment 83 for the digit 0 and the contacts 81 for the digit 9 are similarly connected to the segment 83 for the digit 1. The segments 83 are each cross-connected to a segment 85 so that the reading obtained from the segments 85 by a normally positioned brush 86 will be the complement of that obtained from the segments 83 by the brush 84. Referring now to the table, it will be noted that the set-up effected by closing one of the contacts 81 will render alive the contact spot corresponding to the converted units digit as shown by column 3 of the table when the tens digit of the amount read is zero.

When the tens digit is 1 it is necessary to enter to the adding mechanism a digit which is two higher than the units digit read, that is to say, if 13 is read it is necessary to enter 5 into the units adding wheel. This is in effect a phase change and is effected by altering the phase of the units of cycle of the translator with respect to the cycle of the adding mechanism. For this purpose a second brush 87 is provided two steps in advance of the brush 84. This brush will read each segment 83 two steps earlier than the brush 84. That is to say, it will read the three segment 83 at the five time in the cycle so that if the three segment is rendered alive by the closure of the contacts 81 for the digit 3, an impulse will be transmitted through brush 87 at the five time in the cycle. The three segment is connected to the four segment 85 since the complement of three with respect to 7 is 4. It is, however, necessary to read two instead of four when the tens digit read is 1. That is to say, the segments 85 must be read two steps later in the cycle when the tens digit is 1 and a special brush 88 is provided for this purpose.

The brushes 84 and 87 are connected to the contacts 22a by triple contacts 89a of which the lower contacts are normally closed while the brushes 86 and 88 are connected to contact 22b by triple contacts 89b of which the lower contacts are normally closed. It will be seen that the contacts 89a and 89b normally connect the brushes 84 and 86 to the contacts 22a and 22b.

The contacts 89a and 89b are controlled by a coil 89 which is connected to a brush 90 that cooperates with a commutator segment 92 on the tens translator. The segment 92 is connected to the contacts 69 allocated to the digit 1. Thus if the tens translator has been set up to represent 1 by the closure of the contacts 69 for the digit 1, the segment 92 will be alive and a circuit will be established through this segment, the brush 90 and the coil 89 during the whole of the following card cycle.

This will result in the contacts 89a and 89b being operated so that the brushes 87 and 88 are connected in circuit, the units translator will then operate two steps out of phase with the adding mechanism. From the table given above, it will be noted that the tens translator will be set up to represent 1 when the units translator is set up to represent 8 or 9 and that in these two cases no phase change is required. As has been previously explained the contacts 69a of the tens translator are closed whenever 8 or 9 is read from the units column of the annas field. A circuit is then established through the contacts 69a to a segment 91 and a brush 93, this circuit being in parallel with the circuit through magnet 89. This magnet is thus shunted by a path of low resistance and will not be energized so that the contacts 89a and 89b will remain in their normal position and no phase change will occur. Whether the amounts entered are to be added or subtracted is determined by the contacts 22a and 22b in the manner previously explained.

In order to permit of printing of the annas amounts directly from the cards, the lower brushes LB1 and LB2 are plugged directly to the printing magnets controlling the type bars by which the annas are to be printed. These two lower brushes are not, however, connected to any of the magnets 16.

It will be noted that the complementary amounts are obtained by complementing the units digit with respect to 7, the tens digit with respect to 1, and the remaining decimal digits with respect to 9. The complement thus obtained is one less than the tens complement which must be entered and an additional unit must be added on to the units adding wheels of the accumulator. This may be effected in any known manner, for example, as is described in British patent specification 311,321, it may be entered into the units adding wheel from its transfer mechanism whenever the "X" hole that denotes that an amount is negative is read by the brush UB4.

Total printing—Sixteenths

Figure 5:
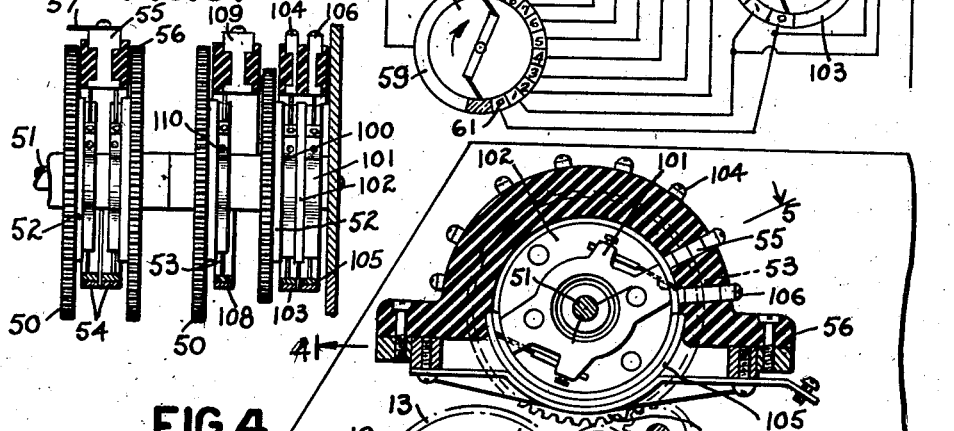
Fig. 5 is a section on the line 5—5 of Fig. 4.
Figure 4:
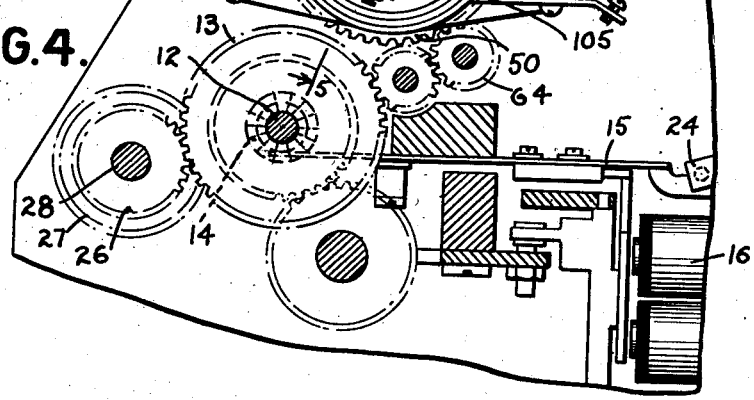
Fig. 4 is a section through an accumulator of the machine and is taken on the line 4—4 of Fig. 5.

Referring to Figs. 4 and 5, the units wheel 50 carries two pairs of brushes 100 and 101, the two pairs being insulated from one another by a second insulating disk 102. The brushes 100 cooperate with a common conducting segment 103 and eight insulated segments 104 while the brushes 101 cooperate with a segment 105 and two segments 106. The segments 104 are allocated to the digits 0 to 7 while the segments 106 are allocated to the digits 0 and 1. The tens commutator is similar to the decimal commutators previously described and comprises ten insulated segments 109 and common segment 108 and a pair of brushes 110.

The machine is provided with two additional impulse emitters 111 and 112 (see Fig. 3) which are identical with the emitter 58. The segments 61 for the digits 0 to 7 of the emitter 112 are connected to the segments 104 like to like. The segments 61 for the digits 0 to 5 to the emitter 111 are connected to the segments 104 for the digits 2 to 7 respectively while the segment 61 of the digit 8 is connected to the segment 104 for the digit 0 and the segment 61 of the digit 9 is connected to the segment 104 for the digit 1. The common segment 59 of one emitter 112 is normally connected through contacts 113a and cam contacts R3 to the line 17, while the common segment 103 is connected through a line 214 to the printing magnet for printing the units denomination of the total. Thus as the emitter 112 operates during total printing cycle an impulse will be transmitted from the line 17 through the contacts R3, 113a, the emitter 112, one of the segments 104, the brush 100, the segment 103, the line 214 and the print magnet 29 to the line 25. This impulse will pass at the time determined by the position of the brush 100 and will result in the digit represented by the position of the brush 100 being printed.

Figure 3:
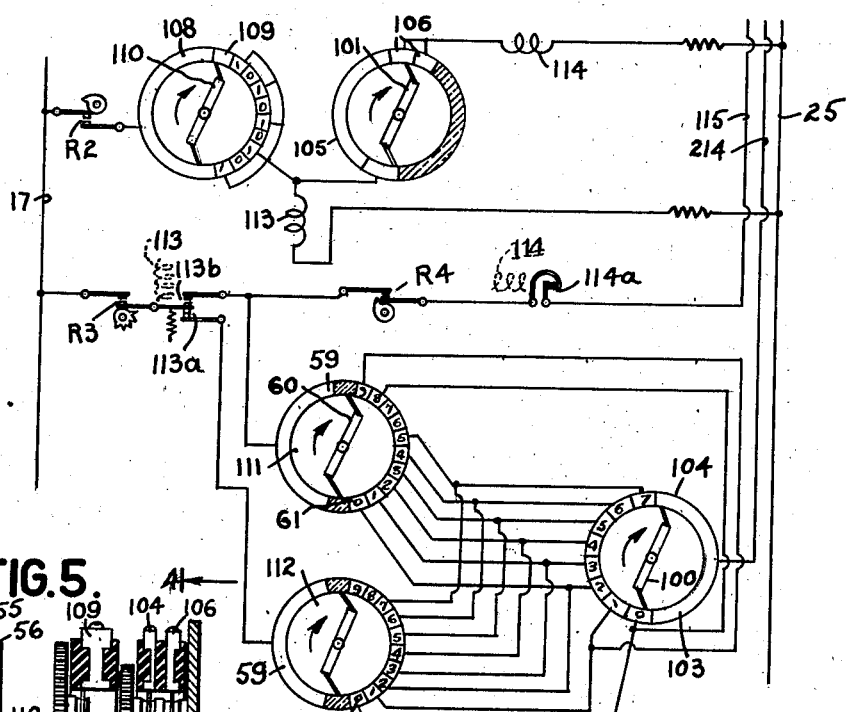

The circuit just described is completed whenever the tens adding wheel stands at 0. It will be seen from the table given above that when the tens adding wheel stands at 10, the digit to be printed is not the digit standing on the units wheel, but the digit two units less. Referring to Fig. 3, all of the segments 109 allocated to the digit 1 are connected together and to a relay coil 113 so that when cam contacts R2 close during total printing cycles, a circuit will be established through these contacts, the segments 108, the brush 110, one of the segments 109 for the digit 1 and the coil 113, if the brush is in position to represent 1. The coil 113 when thus energized opens the contacts 113a and closes the contacts 113b, thereby interrupting the circuit through the emitter 112 and completing the circuit through the emitter 111. Owing to the manner in which the emitter 111 is connected to the segments 104, the impulse which passes through the segment 104 which is engaged by the brush 100 will be transmitted two steps later in the cycle than if the emitter 112 had been controlling the operation and the printing magnet 29 will arrest its type bar in position to print a digit two units lower than the digit standing on the units adding wheel.

The energization of the magnet 113 also established a circuit from the line 17 through the cam contacts R3, the contacts 113b, cam contacts R4 which close at the one time in the cycle, normally closed relay contacts 114a, a line 115 and the printing magnet 29 allocated to the tens denomination to the other supply line 25. The magnet will thus be energized to print 1. From the table given above it will be noted that 0 should be printed by the tens type bar when the tens adding wheel stands at 1 and the units wheel stands at 1 or 0. When this occurs, the magnet 114 is energized and opens the relay contacts 114a so that no circuit will be established through the printing magnet 29.

The magnet is energized over a circuit extending through the contacts R2, the segment 108, the brush 110, one of the segments 109 allocated to the digit 1, the segment 105 of the second units commutator, the brush 101 and one of the segments 106 which are connected together and the magnet 114 to the line 25. This circuit can only be established under the conditions explained above so that unless both the tens adding wheel stands at 1 and the units adding wheel stands at 1 or 0 the magnet 114 will not be energized and the contacts 114a will be closed. If the tens adding wheel stands at 0 the circuit through the coil 113 will be interrupted at the brush 110 and the contacts 113b will be opened so that the circuit through the tens printing magnet will not be completed. Thus, if the tens adding wheel stands at 0, or the tens adding wheel stands at 1 and the units adding wheel stands at 1 or 0, the tens printing magnet will not be energized and the tens type bar will rise in a known manner into position to print zero.

It will be seen that one translating mechanism is used for converting the annas from a normal notation into a notation appropriate to the adding mechanism, while the second translating mechanism is employed for converting the totals back into the normal notation. Both the translating mechanisms are operable either in phase with the receiving device or two steps out of phase. The provision of the additional brushes 87 and 88 is equivalent to providing two sets of segments 83 and two sets of segments 85 arranged two steps out of phase with one another and the modified arrangement would correspond to the two emitters 111 and 112 of Fig. 3. In handling the tens digits advantage has been taken of the fact that the tens digits must be either 1 or 0 and the method in which the tens digits are handled as explained above is only applicable to the fractions twelfths, fourteenths, sixteenths and eighteenths. Fractions such as fifteenths and those whose denominators are higher than 20 cannot be dealt with in the manner just explained but must be handled in the manner which will be explained later.

British currency

In British currency the shillings are usually dealt with by employing a twos wheel for the tens of shillings and the decimal wheel for the units of shillings. Hitherto, it has been the practice to employ a duo-decimal wheel for the pence which necessitates employing a duo-decimal type bar for printing the pence with the result that pence can only be printed by a particular type bar so that the flexibility of the machine is restricted.

The mechanism just described may be modified in the following manner in order to deal with the pence. The units adding wheel would be a sixes wheel and the amounts would be entered in a notation involving halves of shillings and sixths of halves of shillings. Since it is necessary to enter 1 into the tens adding wheel when the units amount read is 6, 7, 8 or 9, the cam contacts CF7 (Fig. 2) are arranged to close while the hole positions 9 to 6 are being read. The contacts 69a would be thus allocated to the digit 6. The segments 83 and 85 for the digits 6 and 7 would be omitted and the contacts 81 for the digit 6 would be connected to the segment 83 for the digit 0, the contacts 81 for the digit 7 to the segment 83 for the digit 0, and so on with contacts 81 for the digits 8 and 9. It is necessary to have a phase change of four instead of a phase change of two and the brush 87 would therefore be situated four steps in advance of the brush 84 and the brush 88 four steps behind the brush 86. Four segments 106 would be allocated to the digits 0, 1, 2 and 3 and all connected to the relay 114. There will only be six segments 104 and the connections from the segments 61 for the digits 6 and 7 of the commutator 112 would be omitted. The segments 61 of the commutator 111 for the digits 0 and 1 would be connected to the segments 104 for the digits 4 and 5 while the segments 61 for the digits 6, 7, 8 and 9 of the commutator 111 would be connected respectively to the segments 104 for the digits 0, 1, 2 and 3.

The operation of the mechanism with these modifications is similar to that described above and needs no further explanation.

The arrangement illustrated in Figs. 2 and 3 is applicable to weights involving pounds and ounces only. When, however, it is necessary to handle weights involving tons, cwts., qrs. and lbs. the mechanism illustrated in Figs. 8 and 9 must be employed. The tons will be handled by decimal wheels in the usual manner, the cwts. by means of a twos wheel and a decimal wheel in the manner explained for shillings. The qrs. will be handled with a fours wheel in known manner. The lbs. are handled by a fours wheel and a sevens wheel in the manner which will now be explained. In this present example, the long quarter is being considered. Its equivalent is twenty-eight pounds.

*Table II—Twenty-eighths*.

| Punching | Adding | Total printing |
|---|---|---|
| 00 | 00 | 00 |
| 01 | 01 | 01 |
| 02 | 02 | 02 |
| 03 | 03 | 03 |
| 04 | 04 | 04 |
| 05 | 05 | 05 |
| 06 | 06 | 06 |
| 07 | 10 | 07 |
| 08 | 11 | 08 |
| 09 | 12 | 09 |
| 10 | 13 | 10 |
| 11 | 14 | 11 |
| 12 | 15 | 12 |
| 13 | 16 | 13 |
| 14 | 20 | 14 |
| 15 | 21 | 15 |
| 16 | 22 | 16 |
| 17 | 23 | 17 |
| 18 | 24 | 18 |
| 19 | 25 | 19 |
| 20 | 26 | 20 |
| 21 | 30 | 21 |
| 22 | 31 | 22 |
| 23 | 32 | 23 |
| 24 | 33 | 24 |
| 25 | 34 | 25 |
| 26 | 35 | 26 |
| 27 | 36 | 27 |

↑Conversion↑ ↑Reconversion↑

The above table shows the manner in which twenty-eighths are dealt with. The amounts are punched in the usual manner and are then converted into a special notation and subsequently the total is reconverted into the normal notation. The column of the card containing the tens of lbs. is read by an upper brush UB2 and when a hole is read a circuit is established through the brush UB2, contacts 120 and 122 in parallel, a translator magnet 121 and a translator magnet 123. Two translating mechanisms are provided, one controlled by the magnet 121 and including the contacts 120 and the other by the magnet 123 and including the contacts 122. Thus, there is a double set up of the tens digit read. The units of lbs. are read by a brush UB1 and a circuit is set up in a similar manner through contacts 124 and 126, a translator magnet 125 and a translator magnet 127. The magnets 125 and 127 each control a separate translator so that there is a dual set-up of the units digit read. The four translators are shown one below the other in Fig. 9, the uppermost one being controlled by the magnet 121, the second by the magnet 123, the third by the magnet 125 and the fourth by the magnet 127.

The uppermost translator comprises three contacts 128 connected at one side to a common segment 129 which is read by a brush 130 and at the other side individually each to one of three segments 131, 132, 133. These segments cooperate with brushes 134, 135 and 136 respectively. These brushes are connected respectively to one side of three magnets 137, 138 and 139 which are connected together to the other side and to the supply line 25 by a line 140. One of the contacts 128 will be closed in accordance with tens digit read so that during the following cycle a circuit will be established from the supply line 17 to the contacts CF1 and LCLC, the line 19, the brush 130, the segment 129, the closed contacts 128, the connected segment 131 and 132 or 133, and one of the magnets 137, 138 and 139 to the line 25. One of these three magnets will thus be energized and will close contacts to control the operation of the units translating mechanism. The uppermost translating mechanism is thus purely a controlling mechanism and does not emit timed impulses.

The lowermost translator comprises ten contacts 141 controlled by the magnet 127 and connected at one side to a common segment 142 which cooperates with a brush 143. The translator includes three commutators 144, 145 and 146 cooperating respectively with brushes 147, 148 and 149 and each having seven segments which pass the cooperating brushes at the times 6 to 0 of the machine cycle, so that each segment corresponds to a digit of the notation of the units adding wheel. The contacts 141 for the digits 0 to 6 are each connected to the segment 144 for the same digit while the contacts 141 for the digits 7, 8 and 9 are connected respectively to the segments 144 for the digits 0, 1 and 2.

When the tens digit is 0 the contacts 128 allocated to 0 will be closed during one card cycle and they will remain closed during the next cycle. The magnet 139 is thus energized during this latter cycle and closes its contacts 139a to connect the brush 147 to the units adding magnet 16. An impulse will thus be transmitted to this magnet through one of the segments 144 at a time determined by which pair of the contacts 141 is closed. In this manner the conversions of the units digits shown in the first ten lines of Table II are effected.

The segments 144 are each connected to the segments 145 for the next lower digit, the digits being regarded as forming a closed cycle in which zero follows on six, so that there is a phase difference of minus one between the commutators 144 and 145. The segments 145 are in turn connected each to the segments 146 for the fourth higher digit that to 0 to 4, 1 to 5, 2 to 6, 3 to 0, 4 to 1, etc. There is thus a phase difference of plus three between the commutators 146 and 145. When the tens digit read is 1 the magnet 138 is energized and closes its contacts 138a, connecting the brush 149 to the units adding magnet 16. When the tens digit is 2 the magnet 137 is energized and closes its contacts 137a to connect the brush 148 to the units adding magnet 16.

Assume that the units digit is 1 or 8. In either case the segment 144 for the digit 1, the segment 145 for the digit 0 and the segment 146 for the digit 4 will be connected to the common segment 142. Whether 1, 0 or 4 is added depends on the tens digit read. If the tens digit is 0, 1 is added and it will be noted from Table II that when both 01 and 08 are read, 1 is to be added in the units wheel while if the tens digit is 1, 4 will be added and from Table II it will be seen that when 11 or 18 is read, 4 must be added into the units wheel. In the same way when 21 is read, 0 will be added into the units wheel. The outer units translator controls the operation of the second tens translator. This units translator comprises contacts 150 controlled by the magnet 125 and connected on one side to a common segment 151 which cooperates with a brush 152. On their other sides the contacts are connected as shown in groups to segments 153, 154 and 155 which cooperate with brushes 157, 158 and 159. If the contacts 150 for the digits 7, 8 or 9 are closed during one card cycle, a circuit will be established extending through the brush 152, the segment 151, the closed contacts 150 the segment 153, the brush 157 and the relay magnet 161 which will be energized for the duration of the succeeding card cycle. In the same way the magnet 162 is energized if the units digit read is 4, 5, or 6, the magnet 163 if this digit is 1, 2 or 3.

The second tens translator comprises three contacts 165 controlled by the magnet 123 and allocated to the digits 0, 1 and 2. The contacts 168 are connected to a common segment 166 cooperating with a brush 167 and individually to segment 168 allocated to the digits 0, 1 and 2 and cooperating with a brush 172 which is connected to the tens adding magnet 16. Thus when one of contacts 165 has been closed in accordance with the tens digit read, an impulse will be transmitted through the closed contacts 165, the connected segment 168, the brush 172 and the tens adding magnet at the time in the cycle corresponding to the digit read.

It will be seen from Table II that the digit entered must in certain cases be one more than the digit read. That is, a phase change of 1 is required. The translator is provided with segments 169, 170 and 171 allocated respectively to the digits 1, 2 and 3 and connected each to the segment 168 for the next lower digit. The segments 169 and 170 and 171 cooperate with brushes 173, 174 and 175 which may be connected to the tens adding magnets 16 by the closure of normally open contacts 161a to 163a controlled by the magnets 161 to 163.

If the units digit entered is 7, 8 or 9, a phase change must always be effected as may be seen from Table II. When one of these digits is entered, the magnet 161 is energized as explained above and closes the contacts 161a, 161b and 161c, which connect all three brushes 173, 174 and 175 to the entering magnet. Then a circuit will be established through the closed contacts 165, the connected segments 168 and 169, 170 or 171, the cooperating brush 173, 174 or 175, the contacts 161a, 161b, or 161c and the tens adding magnet 16 and contacts 24. The tens adding magnet then engages its clutch at the time corresponding to the digit that is one higher than the digit read and opens its contacts 24, in a known manner, to break the tens adding circuit. Immediately after this, the brush 172 engages the segment 168 that is connected to the closed contacts 165 but no circuit is completed since the contacts 24 are open.

If the units digit read is 4, 5, or 6, a phase change must be effected when the tens digit is 1 or 2 but not when it is 0. The magnet 162 is energized when the units digit is 4, 5, or 6 and closes contacts 162a and 162b to connect the brushes 174 and 175 to the entering magnet. If the tens digit is 1 or 2, a circuit is established, as explained above, through the segment 170 or the segment 171 at the "2" or the "3" time in the cycle, but, if the tens digit is 0, no circuit will be established through the segment 169 at the "1" time since the contacts 161a are open and the brush 173 is not connected to the tens adding magnet.

Thus if the tens digit is 0 the tens adding magnet will be energized at the "0" time through the segment 168 for the digit 0 and the brush 172. Lastly, if the units digit is 1, 2, or 3, the magnet 163 is energized and closes the contacts 163a so that the brush 175 is connected to the tens adding magnet but not the brushes 173 and 174. The tens adding magnet will now be energized at the "3" time if the contacts 165 for the digit 2 are closed, and at the "1" or the "0" time if the contacts allocated 165 to 1 or 0 are closed.

*Total printing—twenty-eighths*

The units adding section of the accumulator is provided with three reading out commutators 180, 181 and 182 (Fig. 8) each comprising a common segment, a pair of brushes and seven insulated segments and similar to that shown in Figs. 3 and 4. Two of these commutators may be arranged on one side of the units gear wheel 50 and one of the other side of this wheel. The tens section is provided with two commutators 183 and 184 each comprising a common segment, a pair of brushes and four insulated segments. The machine is provided with a single emitting or timing commutator 185 similar to the commutator 58 and driven by the reset motor, whose common segment 59 is connected to the main line 17 and whose segments 61 are connected individually to bus lines 186. The bus lines 186 may be connected to the decimal reading out commutators in the manner explained. The segments 187 of the commutator 180 are connected individually to bus lines 188 while the common segment 190 of this commutator is connected to the units printing magnet 29. Thus one of the bus lines 188 will be connected to the magnet 29 by the brush 190 in accordance with the units digit of the total on the accumulator. Each line 188 thus has a digital value and the lines 186 also have a digital value. Each of the lines 188 may be connected to the line 186 for the same digit by the closure of a group of normally open contacts 191a to 191g, to the line 186 for the third lower digit by the closure of a group of contacts 192a to 192g, to the line 186 for the fourth higher value by the closure of a group of contacts 193a to 193g and to the line 186 for the next higher value by the closure of a group of contacts 194a to 194g.

The common segment 195 of the commutator 184 is connected through contacts R5 to the supply line 17 and the segments 196 are connected individually to relay magnets 191, 192, 193 and 194.

Assume that the total on the accumulator is 12, in which case 9 is to be printed. When a reset cycle is initiated, the contacts R5 close just before the "9" time in the cycle and open just after the "0" time. A circuit is thus established from the line 17 through the contacts R5, the segment 195, the brush 195 which stands at "1" the segment 196 for "1" and the relay magnet 192 to the line 25. The magnet 192 then closes the relay contacts 192a to 192g. The brush 60 of the emitting commutator 185 is rotating and when it reaches the "9" segment a circuit is established extending from the line 17 through the segment 59, the brush 60, the segment 61 for "9" the line 186 for "9", the contacts 192e, the third line 188 to the left, the segment 187 for "2", the brush 190, the segment 190 and the printing magnet 29. This magnet is thus energized at the nine time and arrests its type bar in position to print 9.

The common segment 198 of the tens reading out commutator 183 is connected to the magnet 29. Since 0 is to be printed when the tens digit of the total is 0 and 2 when the tens digit is 3 (see Table II) the segments 199 for 0 and 3 are connected to the bus lines 186 which transmit impulses at the "0" and "2" times respectively. The segment 199 for "1" is connected to the common segment 201 of the units reading out commutator 182 whose segments 202 for "0", "1" and "2" are connected to the line 186 transmitting at the "0" time and whose segments 202 for "3" to "6" are connected to the line 186 transmitting at the "1" time. The segment 199 for "2" is connected to the common segment 234 of the units commutator whose segments 205 for "0" to "5" are connected to the line 186 transmitting at the "1" time whose segment 205 for "6" is connected to the line 186 transmitting at the "2" time.

Taking the example of 12 considered above, the brushes 201 and 206 will engage the segments for "2" and the brush 200 the segment for "1". When the brush 60 reaches the segment 61 for "0" a circuit will be established through the left hand line 186, the segment 202 for 2, the brush 203, the common segment 201, the segment 199 for "1", the brush 200, the common segment 198 and the tens magnet 29. This magnet will thus be energized at the zero time and will arrest its type bar in position to print zero. If the digit had been 3, 4, 5, or 6, a circuit would have been established at the "1" time in the cycle. When the tens digit is 2 the circuit extends through the commutator 181 and is established at the "2" time if the units digit is 6, and at the "1" time for the other units digits.

The above has described how twenty-eighths may be added and the total printed. Subtraction may be effected in a manner analogous to that described with reference to Fig. 2.

It will be seen that the controlling record cards may be punched in the normal manner so that the amounts may be printed directly from the cards in the normal notation. The amounts read are converted into a special notation for adding purposes and the total reconverted into the normal notation for printing. The translating mechanism shown in Figs. 2 and 6 is applicable only to machines in which the cards are read in motion. When the invention is applied to a record card controlled machine in which the cards are read while stationary by a pin box mechanism or to a machine in which the amounts are entered by a keyboard, the translating mechanism for converting the amounts read or entered and transmitting them to the adding mechanism would be arranged in the manner shown in Fig. 9 where there is a stationary set up of the amount to be converted. It will be noted that no number higher than nine has to be printed by any type bar so that all the type bars may alike be arranged to print the digits 0 to 9. This allows of the amounts involving fractions being printed by any set of type bars it being merely necessary to plug to proper magnets 29 up to the lower brushes and to the reading out translating mechanism.

The invention has been described as applied to a machine having but one accumulator but can readily be applied to one having several accumulators, it being merely necessary to provide a sufficient number of special adding sections and translators. As stated above, the transfer mechanism is preferably of the electrical kind. The use of electrical transfer mechanism is preferred since it is then merely necessary to provide a suitable number of special adding sections, say, in the case of sixteenths, five "twos" and five "eights" adding sections. These special sections can then be plugged up through the transfer mechanism to the decimal adding sections to form complete accumulators.

It will be appreciated that the invention is not restricted in its application to statistical machines but is also applicable to adding and other calculating machines.

Having now particularly described and ascertained the nature of the said invention and in what manner the same is to be performed, I intend to be limited only by the scope of the following claims.

I claim:—

1. In a machine for handling fractions, means for analyzing a perforation in a column of a record card representing by its location the numerator of a fraction, an entry receiving mechanism including a plurality of devices advanceable in different increments and having transfer mechanism between the individual devices, entering means therefor and means controlled by said analyzing means upon analysis of said perforation for causing operation of said entering means and an advance of each of said devices by amounts jointly indicative of the value of said fraction.

2. In a machine for handling fractions, means for analyzing a perforation in a column of a record card representing the numerator of a fraction, an accumulator including a pair of adding wheels of different denominational orders, associated with one another through transfer mechanism, entering means therefor, a commutator device controlled by said analyzing means and means controlled by said device for causing operation of said entering means and an advance of each of said pair of wheels by amounts jointly indicative of the value of said fraction.

3. In a machine of the class described, means for analyzing a record card for perforations representative of the numerator of a fraction, means controlled by said analyzing means for converting the numerator analyzed, into numerators of a plurality of other fractions of different denominations, adding mechanism including a pair of denominational orders with transfer mechanism therebetween, entering means therefor adapted to receive numerators of said last named fractions and means controlled by said converting means for causing operation of said entering means and an advance of each of said pair of denominational orders by amounts jointly indicative of the value of said fraction.

4. In a machine of the class described, means for analyzing perforations in a record card representative of annas, an accumulator including a denominational order adapted to receive entries in increments representative of sixteenths of a rupee and a denominational order adapted to receive entries in increments representative of half a rupee, and means controlled by said analyzing means for converting annas into halves of rupees and sixteenths of a rupee and for causing the entry of the even halves of a rupee in the second named order and the remainder in the first named order.

5. In a machine of the class described, means for analyzing a pair of columns of a record card for perforations representing tens of annas in one column and units of annas in the other, an accumulator including a denominational order adapted to receive entries in increments representative of sixteenths of a rupee and a denominational order adapted to receive entries in increments representative of half a rupee, and means controlled by said analyzing means for converting the tens and units of annas into halves of rupees and sixteenths of rupees and for causing the entry of the even halves of a rupee in the second named order and the remainder in the first named order.

6. In a machine of the class described, means for analyzing a pair of columns of a record card for perforations representing tens of pounds in one column and units of pounds in the other, an accumulator including a denominational order adapted to receive entries in increments representative of sevenths of a quarter and a denominational order adapted to receive entries in increments representative of fourths of a quarter, and means controlled by said analyzing means for converting the tens and units of columns into quarters and sevenths of quarters and for causing the entry of even thirds of a quarter in the second named order and the remainder in the first named order.

CHARLES CAMPBELL.